United States Patent
Lu

(10) Patent No.: US 6,357,165 B1
(45) Date of Patent: Mar. 19, 2002

(54) FISHING ROD STRUCTURE

(76) Inventor: Wu Shiung Lu, No. 1, Lane 292, Sec. 2 Ya Tien Rd., Tien Tzu Hsiang, Taichung Hsien (TW)

( * ) Notice: Subject to any disclaimer, the term of this patent is extended or adjusted under 35 U.S.C. 154(b) by 0 days.

(21) Appl. No.: 09/671,249

(22) Filed: Sep. 28, 2000

(51) Int. Cl.[7] ............................................... A01K 87/06
(52) U.S. Cl. ............................................ 43/18.1; 43/22
(58) Field of Search ................................ 43/18.1, 18.5, 43/21.2, 20, 22, 23, 25

(56) References Cited

U.S. PATENT DOCUMENTS

| | | | | |
|---|---|---|---|---|
| 4,839,981 A | * | 6/1989 | Yasui | 43/18.1 |
| 4,864,764 A | * | 9/1989 | Yamato | 43/22 |
| 4,918,852 A | * | 4/1990 | Yamato | 43/22 |

* cited by examiner

Primary Examiner—Charles T. Jordan
Assistant Examiner—Bret Hayes
(74) Attorney, Agent, or Firm—Rosenberg, Klein & Lee

(57) ABSTRACT

A fishing rod structure including a handle and a fixing seat disposed on front section of the handle. A front end of the fixing seat is formed with a thread section on which a movable seat is screwed for fixing a line winder. A locating ring is fitted on the movable seat. A rib section is formed on inner wall of the locating ring. The thread section of the fixing seat being formed with an axially extending notch in which the rib section is fitted. A top section of the locating ring is formed with a receptacle in which a base seat of a thread sleeve is seated. An inner thread of the thread sleeve is screwed on the thread section of the fixing seat. A circumferential wall of the receptacle is formed with a toothed face. An abutting member is disposed on the base seat of the thread sleeve. The abutting member protrudes out of the base seat to abut against the toothed face of the receptacle.

3 Claims, 6 Drawing Sheets

FISHING ROD STRUCTURE

BACKGROUND OF THE INVENTION

The present invention relates to an improved fishing rod structure, and more particularly to a fishing rod in which the movable seat for fixing the line winder has simple structure and can be easily manufactured.

FIGS. 4 to 6 show a conventional fishing rod including a handle 81 and a fixing seat 82 mounted on the handle 81. The front end of the fixing seat 82 is formed with a thread section 83. The front end of the thread section 83 has a differential section 84. A movable seat 9 is screwed on the thread section 83. A collar 91 is fixed on the front section of the movable seat 9 corresponding to the differential section 84. The collar 91 has a diameter larger than the maximum diameter of the differential section 84. A top section of the collar 91 is formed with a receptacle 92. The bottom face of the receptacle 92 is formed with a hole 93 in which an abutting pin 94 and a spring 95 are disposed. A disc member 97 is locked in the receptacle 92 by a fastening ring 96. The disc member 97 is formed with a central differential hole 971 complementary to the differential section 84. The disc member 97 has a toothed bottom face 972. The abutting pin 94 is pushed by the spring 95 to abut against the toothed face 972 of the disc member 97. The differential section 84 is inserted into the differential hole 971 of the disc member 97 to restrict the disc member 97 from rotating. When rotating the movable seat 9, the collar 91 is driven to rotate. At this time, the abutting pin 94 abrades the toothed face 972 of the disc member 97 to increase the frictional resistance so as to avoid loosening. In addition, when rotating the movable seat 9 for tightly clamping the line winder, the tightening travel of the movable seat 9 can be judged by means of the number of the sounds emitted by the rotated movable seat 9 so as to identify the tightness of the line winder clamped by the movable seat 9.

According to the above arrangement, the hole 93 of the collar 91 of the movable seat 9, the abutting pin 94 and the spring 95 all have very small size so that it is uneasy to manufacture and process these components and the manufacturing cost is relatively high. Moreover, it is uneasy to assemble these tiny components and it often takes place that some of the components are missing or are neglected when installed.

SUMMARY OF THE INVENTION

It is therefore a primary object of the present invention to provide an improved fishing rod structure in which a locating ring is fitted on a movable seat; The locating ring is formed with a receptacle in which a base seat of a thread sleeve is seated. A circumferential wall of the receptacle is formed with a toothed face. A rib section is formed an inner wall of the locating ring. The thread section of the fixing seat is formed with an axially extending notch in which the rib section is fitted. An abutting member is disposed on the base seat of the thread sleeve. The abutting member protrudes out of the base seat to abut against the toothed face of the receptacle so as to create greater frictional resistance and thus avoid loosening. The fishing rod has fewer components and simpler structure so that it can be easily manufactured and assembled.

The present invention can be best understood through the following description and accompanying drawings wherein:

DETAILED DESCRIPTION OF THE PREFERRED EMBODIMENT

Figure 1:
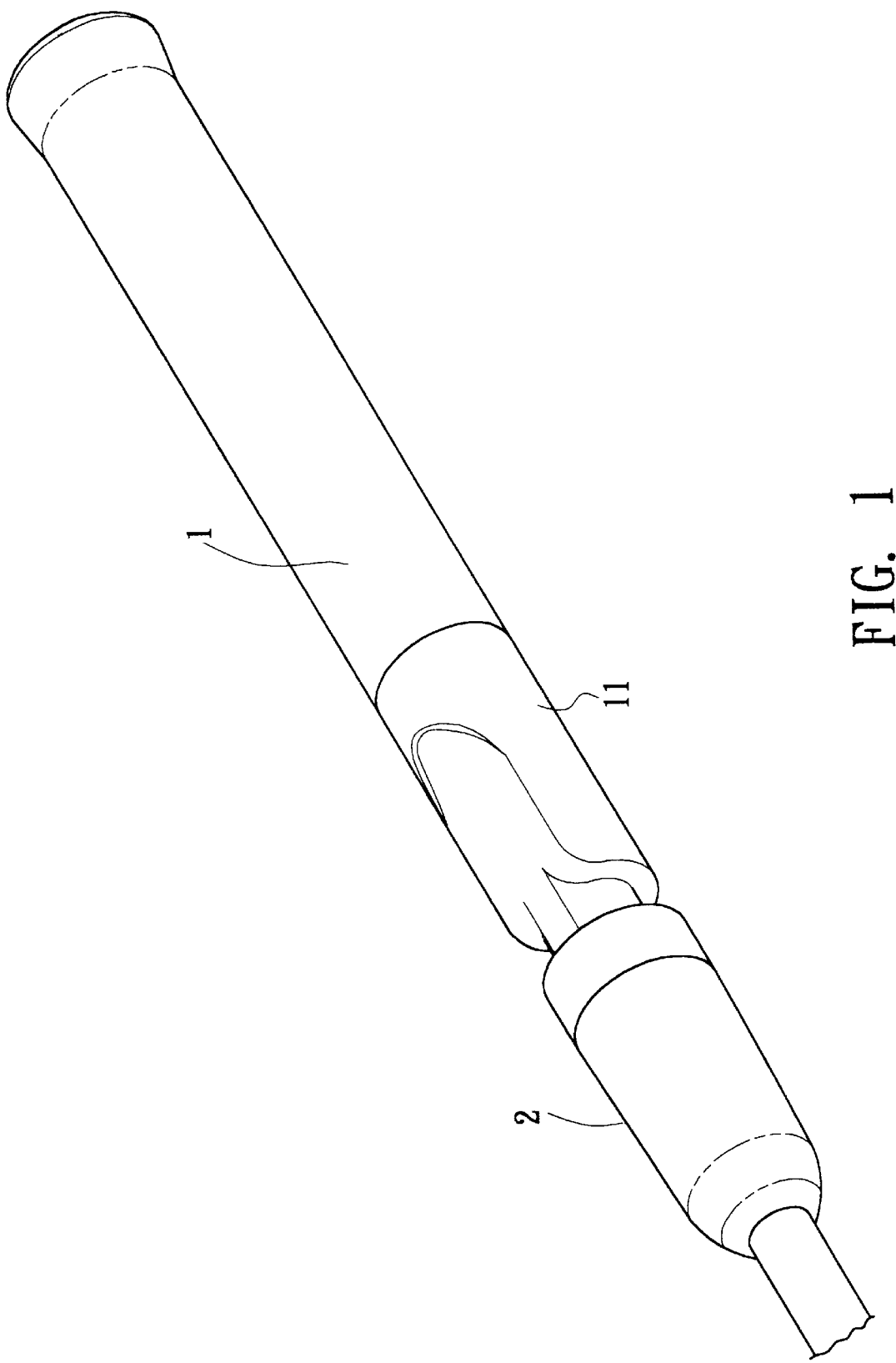
FIG. 1 is a perspective assembled view of the fishing rod structure of the present invention.
Figure 2:
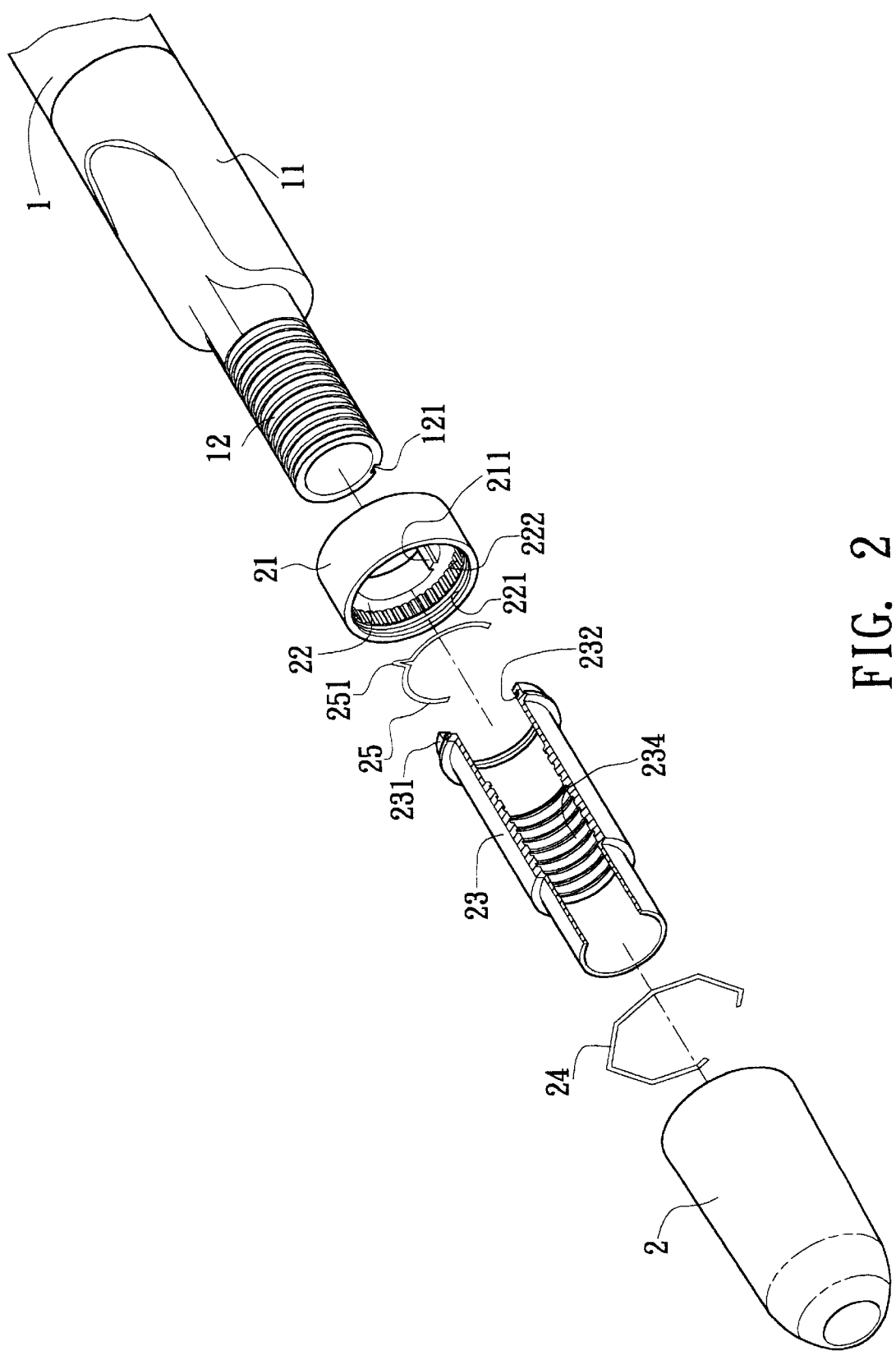
FIG. 2 is a perspective exploded view of the fishing rod structure of the present invention.
Figure 3:
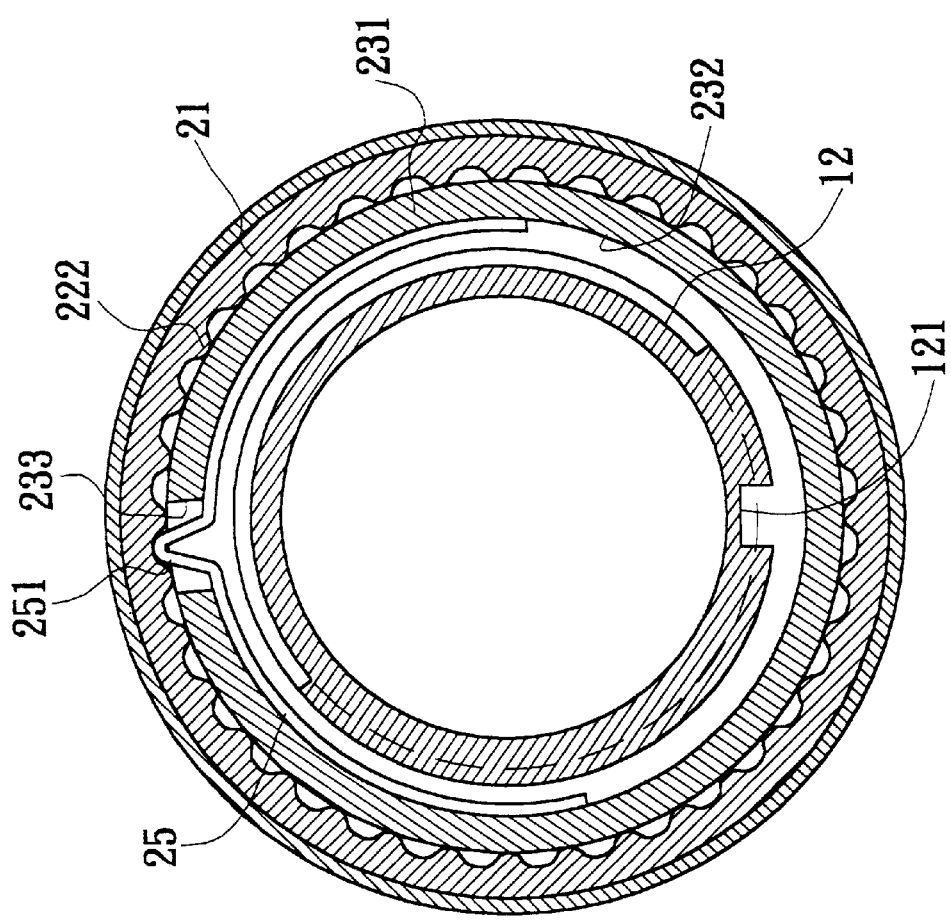
FIG. 3 is a sectional view of FIG. 1.
Figure 4:
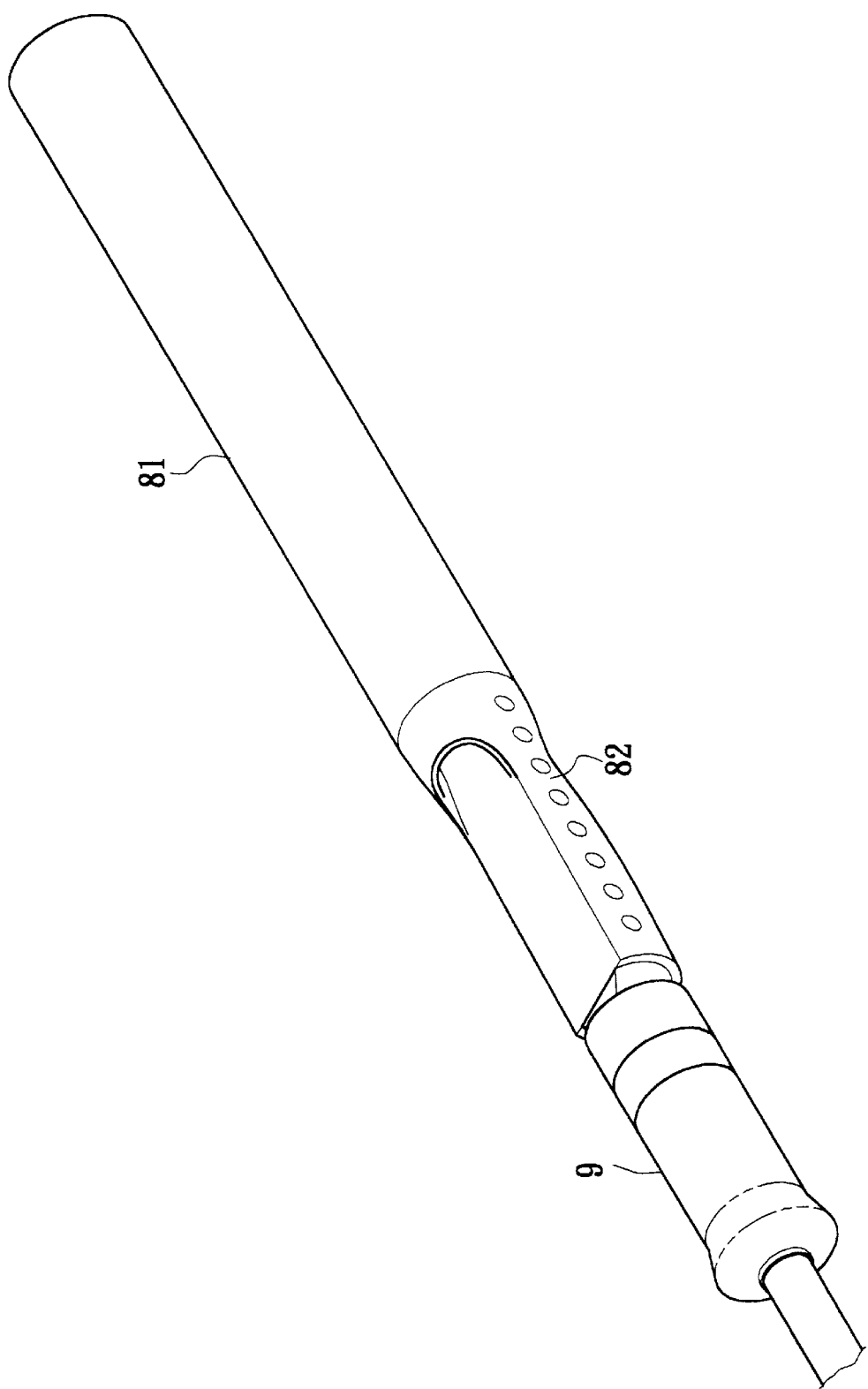
FIG. 4 is a perspective assembled view of a conventional fishing rod.
Figure 5:
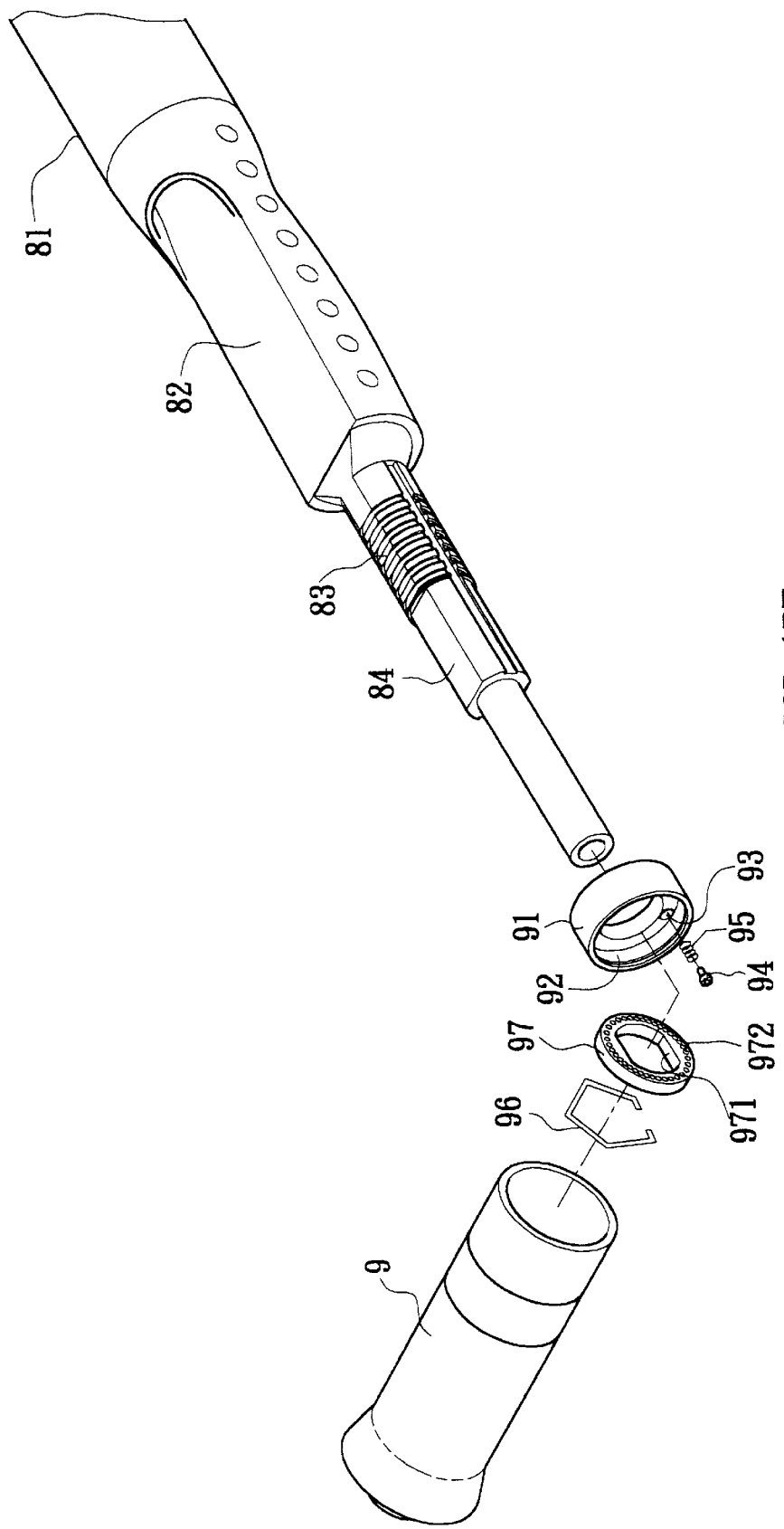
FIG. 5 is a perspective exploded view of the conventional fishing rod.
Figure 6:
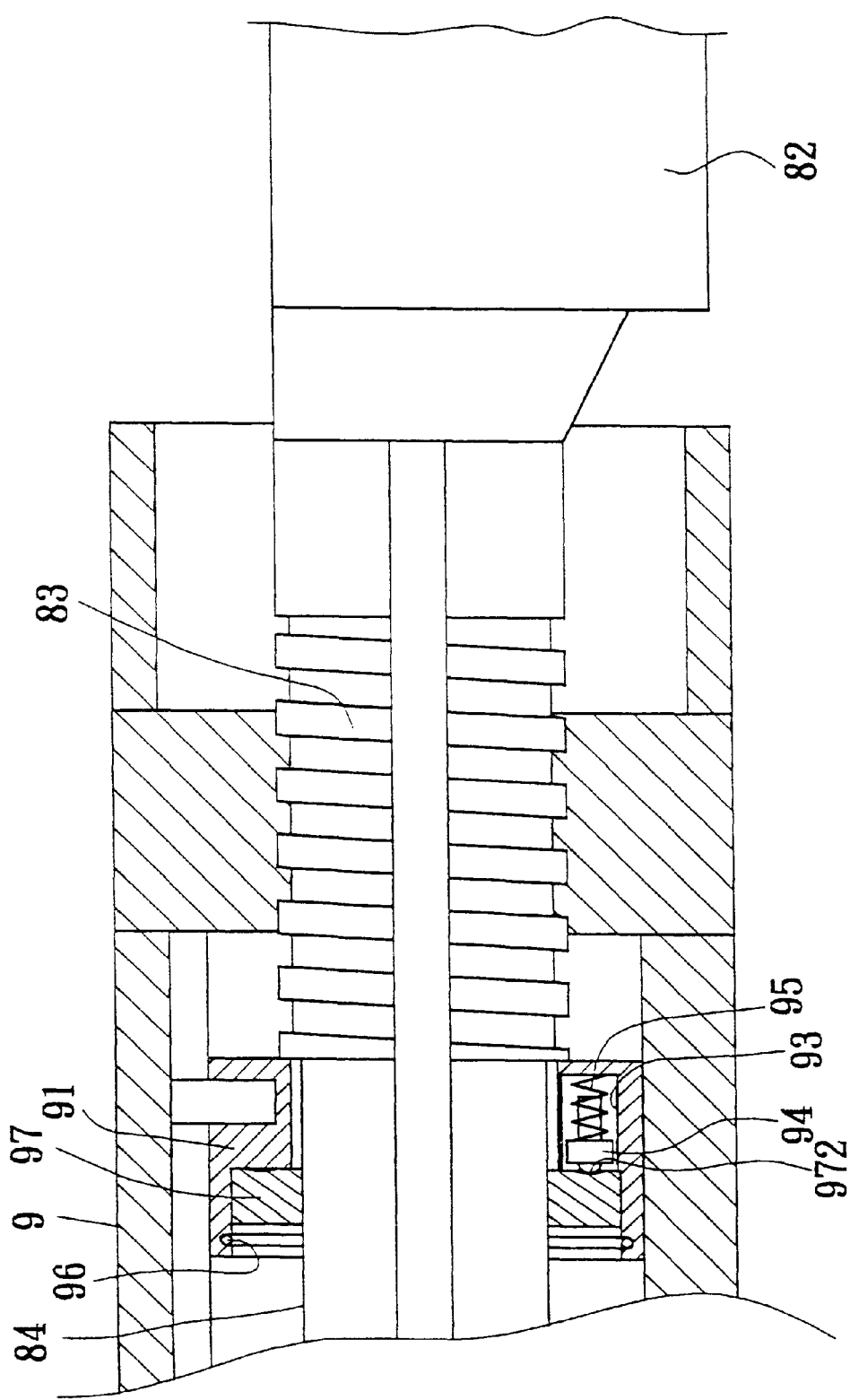
FIG. 6 is a sectional view of the conventional fishing rod.

Please refer to FIGS. 1 to 3. The fishing rod structure of the present invention includes a handle 1 and a fixing seat 11 disposed on front section of the handle 1 for fixing the line winder. The front end of the fixing seat 11 is formed with a thread section 12 on which a movable seat 2 is screwed for fixing the line winder (not shown). A locating ring 21 is fitted on the movable seat 2. A rib section 211 is formed an inner wall of the locating ring 21. The thread section 12 of the fixing seat 11 is formed with an axially extending notch 121 corresponding to the rib section 211. The top section of the locating ring 21 is formed with inward recessed receptacle 22 in which a base seat 231 of a thread sleeve 23 is seated. The thread seat 23 is formed an inner thread 234 screwed on the thread section 12 of the fixing seat 11. The top edge of the receptacle 22 is formed with an annular groove 221 corresponding to the top face of the base seat 231 of the thread sleeve 23. A fastening ring 24 is inlaid in the annular groove 221 for locating the base seat 231 in the receptacle 22. The circumferential wall of the receptacle 22 is formed with a toothed face 222. The inner circumference of the base seat 231 of the thread sleeve 23 is formed with an annular groove 232. In addition, the base seat 231 is formed with a split 233. A resilient fitting ring 25 is disposed in the annular groove 232. The resilient fitting ring 25 has a middle projecting section 251 which protrudes out of an outer circumference of the base seat 231 through the split 233 to abut against the toothed face 222 of the receptacle 22. An outer cover is fitted around the thread sleeve 23.

The rib section 211 of the locating ring 21 is fitted in the notch 121 of the thread section 12 so that the locating ring 21 is restricted from rotating. When rotating the thread sleeve 23, the projecting section 251 of the fitting ring 25 will abut against the toothed face 222 of the receptacle 22 of the locating rind 21 to create greater resistance and thus avoid loosening. In addition, when rotating the thread sleeve 23, a sound is emitted. The tightening travel of the thread sleeve 23 can be judged by means of the number of the sounds so as to identify the tightness of the line winder clamped by the movable seat 2.

The thread sleeve 23 and the locating ring 21 are both made by injection molding. The resilient fitting ring 25 is a resilient member with simple shape. The present invention includes fewer components and thus can be quite easily manufactured and assembled. Therefore, the manufacturing cost is lowered.

The above embodiment is only used to illustrate the present invention, not intended to limit the scope thereof. Many modifications of the above embodiment can be made without departing from the spirit of the present invention.

What is claimed is:

1. A fishing rod structure comprising a handle and a fixing seat disposed on front section of the handle for fixing a line winder, a front end of the fixing seat being formed with a thread section on which a movable seat is screwed for fixing the line winder, said fishing rod structure being characterized in that a locating ring is fitted on the movable seat, a rib section being formed on an inner wall of the locating ring, the thread section of the fixing seat being formed with an axially extending notch corresponding to the rib section, a top section of the locating ring being formed with an inward recessed receptacle in which a base seat of a thread sleeve is seated, a circumferential wall of the receptacle being formed with a toothed face, an abutting member being disposed on the base seat of the thread sleeve, the abutting member protruding out of the base seat to abut against the toothed face of the receptacle, an inner thread of the thread sleeve being screwed on the thread section of the fixing seat.

2. A fishing rod structure as claimed in claim 1, wherein a top edge of the receptacle is formed with an annular groove corresponding to the top face of the base seat of the thread sleeve, a fastening ring being inlaid in the annular groove for locating the base seat in the receptacle.

3. A fishing rod structure as claimed in claim 1, wherein an inner circumference of the base seat of the thread sleeve is formed with an annular groove, the base seat being formed with a split, a resilient fitting ring being disposed in the annular groove, the resilient fitting ring having a middle projecting section which protrudes out of outer circumference of the base seat through the split to abut against the toothed face of the receptacle.

\* \* \* \* \*